(12) United States Patent
Shirataki et al.

(10) Patent No.: US 8,393,453 B2
(45) Date of Patent: Mar. 12, 2013

(54) ONE-WAY CLUTCH OF ROLLER TYPE

(75) Inventors: Hirobumi Shirataki, Fukuroi (JP);
Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 461 days.

(21) Appl. No.: 12/580,096

(22) Filed: Oct. 15, 2009

(65) Prior Publication Data

US 2010/0096235 A1    Apr. 22, 2010

(30) Foreign Application Priority Data

Oct. 16, 2008  (JP) ................................ 2008-267227

(51) Int. Cl.
*F16D 41/06* (2006.01)
(52) U.S. Cl. .............................. 192/45.016; 192/45.013
(58) Field of Classification Search ............. 192/45.006, 192/45.008, 45.013, 45.015, 45.016
See application file for complete search history.

(56) References Cited

U.S. PATENT DOCUMENTS

| | | | |
|---|---|---|---|
| 1,708,215 A | 4/1929 | Chryst | |
| 2,843,238 A | 7/1958 | Rozner | |
| 2,902,125 A | 9/1959 | House et al. | |
| 3,011,606 A | 12/1961 | Ferris et al. | |
| 3,166,169 A | 1/1965 | Wade et al. | |
| 3,190,417 A | 6/1965 | Bacon | |
| 3,547,238 A | 12/1970 | Harmon | |
| 3,656,591 A | 4/1972 | Marland et al. | |
| 3,718,212 A | 2/1973 | Havranek | |
| 4,724,940 A | 2/1988 | Lederman | |
| 4,932,508 A | 6/1990 | Lederman | |
| 4,986,402 A | 1/1991 | Neuwirth et al. | |
| 4,995,490 A | 2/1991 | Kanai | |
| 5,074,393 A * | 12/1991 | Itomi | 192/45.008 |
| 5,271,486 A * | 12/1993 | Okamoto et al. | 192/45.016 |
| 5,279,400 A | 1/1994 | Riggle et al. | |
| 5,328,010 A | 7/1994 | Lederman | |
| 5,343,991 A * | 9/1994 | Premiski et al. | 192/45.006 |

(Continued)

FOREIGN PATENT DOCUMENTS

| | | |
|---|---|---|
| CN | 1592667 A | 3/2005 |
| DE | 29 28 587 A1 | 1/1981 |

(Continued)

OTHER PUBLICATIONS

Office Action issued May 21, 2012, in Japanese Patent Application No. 2008-267227.

(Continued)

*Primary Examiner* — Richard M. Lorence
(74) *Attorney, Agent, or Firm* — Miles and Stockbridge P.C.

(57) ABSTRACT

A one-way clutch comprising an outer race having at least one pocket and a stepped portion formed on an axial one end face of the outer race; an inner race spaced apart from and radially inside of the outer race and coaxially arranged for a relative rotational movement; a roller disposed in the pocket and adapted to transmit torque between the outer race and the inner race ; a cage rotatable relative to the outer race and having a window formed in a cylindrical portion and having a circumferential width smaller than a diameter of the roller and adapted to hold the roller; and a spring disposed in the pocket and adapted to bias the roller toward an engagement direction with respect to a cam surface; wherein a cover portion for covering at least a part of the pocket is provided on the other axial end face of the outer race.

6 Claims, 2 Drawing Sheets

U.S. PATENT DOCUMENTS

| | | | |
|---|---|---|---|
| 5,647,800 | A | 7/1997 | Warnke et al. |
| 5,704,458 | A | 1/1998 | Neuwirth et al. |
| 5,842,548 | A | 12/1998 | Sato et al. |
| 5,941,355 | A | 8/1999 | Iga |
| 6,003,799 | A | 12/1999 | Jung |
| 6,374,974 | B1 | 4/2002 | Wake |
| 6,796,413 | B2 | 9/2004 | Fukui et al. |
| 6,848,552 | B2 | 2/2005 | Miller |
| D586,832 | S | 2/2009 | Shirataki et al. |
| 7,740,118 | B2 | 6/2010 | Shirataki et al. |
| 8,002,096 | B2 | 8/2011 | Shirataki |
| 8,037,986 | B2 | 10/2011 | Takasu |
| 8,042,671 | B2 | 10/2011 | Kinoshita |
| 8,162,114 | B2 | 4/2012 | Shirataki et al. |
| 2003/0085092 | A1 | 5/2003 | Fukui et al. |
| 2004/0139743 | A1 | 7/2004 | Sato |
| 2005/0034951 | A1 | 2/2005 | Takasu |
| 2007/0246318 | A1 | 10/2007 | Shirataki et al. |
| 2007/0251794 | A1* | 11/2007 | Shirataki et al. .......... 192/45.01 |
| 2008/0196995 | A1 | 8/2008 | Mikami et al. |
| 2009/0242346 | A1 | 10/2009 | Kinoshita |
| 2009/0277739 | A1 | 11/2009 | Takasu |
| 2009/0301257 | A1 | 12/2009 | Shirataki et al. |
| 2010/0084239 | A1 | 4/2010 | Ando |
| 2010/0096236 | A1 | 4/2010 | Ando |
| 2010/0101910 | A1 | 4/2010 | Ando |
| 2010/0108455 | A1 | 5/2010 | Shirataki et al. |
| 2010/0116611 | A1 | 5/2010 | Shirataki et al. |
| 2010/0213021 | A1 | 8/2010 | Shirataki |
| 2010/0258398 | A1 | 10/2010 | Shirataki et al. |
| 2010/0314211 | A1 | 12/2010 | Shirataki et al. |

FOREIGN PATENT DOCUMENTS

| | | |
|---|---|---|
| EP | 0 237 243 A1 | 9/1987 |
| JP | 05-044615 A | 2/1993 |
| JP | 08-061192 A | 3/1996 |
| JP | 10-009292 A | 1/1998 |
| JP | 2003-148518 A | 5/2003 |
| JP | 2003-172377 A | 6/2003 |
| JP | 2004-346951 A | 12/2004 |
| JP | 2005-172181 A | 6/2005 |
| JP | 2006-275219 A | 10/2006 |
| JP | 2007-064475 A | 3/2007 |
| JP | 2007-278426 A | 10/2007 |
| JP | 2008-138712 A | 6/2008 |
| JP | 2008-138723 A | 6/2008 |
| TW | 354820 | 3/1999 |
| TW | I264503 B | 10/2006 |
| TW | 200801364 A | 1/2008 |
| WO | WO 03/047809 A1 | 6/2003 |
| WO | WO 2008/047457 A1 | 4/2008 |

OTHER PUBLICATIONS

Office Action issued May 10, 2012, in U.S. Appl. No. 12/680,376.

Office Action issued Aug. 6, 2010 in Taiwan Patent Application No. 097110807.

Office Action issued May 21, 2012 in Japanese Patent Application No. 2008-279407.

Office Action issued Apr. 16, 2012 in Japanese Patent Application No. 2008-148984.

Office Action issued May 21, 2012 in Japanese Patent Application No. 2008-258675.

Office Action dated May 14, 2012 in Chinese Appln. No. CN 200880127624.2.

* cited by examiner

ONE-WAY CLUTCH OF ROLLER TYPE

This application claims the benefit of Japanese Patent Application No. 2008-267227, filed Oct. 16, 2008, which is hereby incorporated by reference herein in its entirety.

BACKGROUND OF THE INVENTION

1. Field of the Invention

The present invention relates to a one-way clutch of roller type used as a part such as a torque transmitting element or a back stopper in a driving apparatus of a motor vehicle, an industrial machine and the like, for example.

2. Related Background Art

In general, a one-way clutch of roller type is comprised of an outer race having at least one pocket provided at its inner periphery with a cam surface, an inner race disposed in concentric with the outer race and having an outer peripheral track surface, a roller disposed within the pocket and adapted to transmit torque between the outer peripheral track surface of the inner race and the inner peripheral cam surface of the outer race, and a spring contacted with an idle rotation side of the roller.

With this arrangement, in the one-way clutch of roller type, the inner race is designed so as to be rotated only in one direction with respect to the outer race by means of a cam mechanism constituted by the roller and the cam surface. That is to say, the inner race is designed so that it is idly rotated relative to the outer race in one direction, and on the other hand, it applies rotational torque to the outer race via the cam mechanism only in an opposite direction.

In the one-way clutch of roller type, to obtain positive engagement, the rollers as torque transmitting members and the springs for biasing the rollers must be prevented from being dislodged from the pockets in an axial direction and a radial direction.

For example, in a conventional one-way clutch used as a starter of a motor bike, as disclosed in Japanese Patent Application Laid-open No. 2007-064475 for example, it has been proposed to provide side plates on both sides of an outer race to prevent dislodgement of rollers and springs.

As disclosed in the above-mentioned Japanese Patent Application Laid-open No. 2007-064475, it was necessary to provide the side plates on both axial sides of the outer race to prevent the dislodgement of the rollers and the springs. Further, in a condition before the one-way clutch is mounted on the inner race, there must be provided separately means for dislodging the rollers and the springs in a radial direction. In any cases, it is difficult to reduce the cost of the clutch.

Accordingly, it is desired to provide a one-way clutch of roller type which has reliability similar to those of conventional clutches in engagement and idle rotation of the one-way clutch and can reduce the cost in comparison with conventional clutches and which includes means for preventing rollers and springs from being dislodged.

SUMMARY OF THE INVENTION

Thus, an object of the present invention is to provide a one-way clutch of roller type which can prevent a roller and a spring from being dislodged and has enhanced reliability in engagement and idle rotation of the one-way clutch, by providing, on an axial end face of an outer race, a cover portion for covering at least a part of a pocket.

To achieve the above object, the present invention provides a one-way clutch of roller type comprising an outer race having at least one pocket provided at its inner periphery with a cam surface and having a stepped portion formed on an inner diameter side of an axial one end face of the outer race; an inner race spaced apart from the outer race radially inside of the outer race and coaxially arranged for a relative rotational movement; a roller disposed in the pocket and adapted to transmit torque between the outer race and the inner race when engaged by the cam surface; a cage rotatable relative to the outer race and having a cylindrical portion, a flange portion fitted in the stepped portion and extending outwardly from the cylindrical portion in the outer diameter direction and a window formed in the cylindrical portion and having a circumferential width smaller than a diameter of the roller and adapted to hold the roller; and a spring disposed in the pocket and adapted to bias the roller toward an engagement direction with respect to the cam surface; and wherein a cover portion for covering at least a part of the pocket is provided on the other axial end face of the outer race.

Further, preferably, in the one-way clutch of roller type according to the present invention, the cover portion is provided on the end face opposite to the axial one end face of the outer race on which the stepped portion is provided.

Further, preferably, in the one-way clutch of roller type according to the present invention, the cover portion is provided on a spring mounting side in a circumferential direction of the pocket.

Further, preferably, in the one-way clutch of roller type according to the present invention, the cover portion is formed by milling.

Further, preferably, in the one-way clutch of roller type according to the present invention, the cover portion is formed integrally with the outer race.

In the one-way clutch of roller type according to the present invention, by providing the cover portion for covering the pocket of the outer race within which the roller and the spring are arranged on the axial end face of the outer race, even in a condition that the one-way clutch is not mounted on an input/output member, the roller and/or the spring can be prevented from being dislodged in an axial direction without providing side plates on both sides of the outer race. Further, by covering the part of the pocket by means of the cover portion, foreign matters such as dust accumulated in the pocket can be discharged through an opened or non-covered portion of the pocket.

Accordingly, since the side plates required in the conventional one-way clutch of roller type can be omitted or eliminated, it is possible to provide a one-way clutch of roller type which can reduce the cost by reducing the number of constructional parts.

In addition, the roller is prevented from being dislodged from the cage in the axial direction and the inner diameter direction by means of the outer race and the cage including the flange portion positioned at the axial one end of the pocket and the substantially rectangular window having the circumferential width smaller than the diameter of the roller in the circumferential direction and passing through the cage in the radial direction and closed at both ends in the axial direction (i.e. window encircled at four sides so that the roller can be seated in the window).

Further, by fitting the flange portion of the cage in the stepped portion provided at the inner diameter portion of the end face of the outer race and by securing a generator and the like to the end face of the outer race near the flange portion, the cage is prevented from being dislodged.

Further, by designing so that the cage can be rotated relative to the outer race, even when the circumferential window width of the cage is smaller than the diameter of the roller to prevent the dislodgement of the roller in the radial direction, since the cage does not obstruct the movement of the roller during the engaging operation of the one-way clutch and during the idle rotation, smooth engagement and idle rotation can be realized, and, regarding the movements of all rollers, the cage affords the synchronous action, thereby providing a one-way clutch of roller type having more engaging reliability.

Further features of the present invention will become apparent from the following description of an exemplary embodiment with reference to the attached drawings.

DETAILED DESCRIPTION OF THE INVENTION

Figure 1:
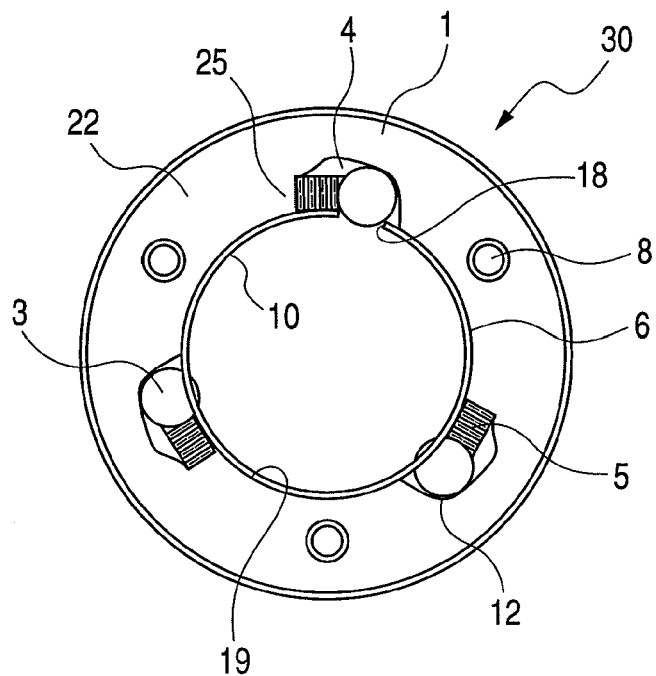
FIG. 1 is a front view showing a one-way clutch of roller type according to an embodiment of the present invention in a condition that the clutch is engaged under a high load, looked at from a side where a cover portion is provided.

Now, an embodiment of the present invention will be fully explained with reference to the accompanying drawings. Incidentally, the same reference numerals denote same or corresponding parts in the drawings. Further, it should be noted that the embodiment which will be described below is merely an example and other alterations and modifications can be made.

Figure 2:
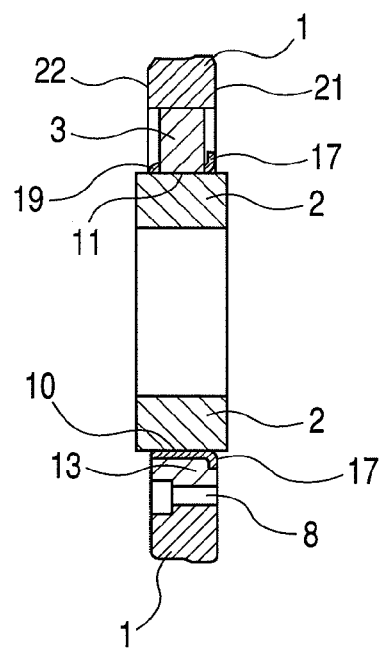
FIG. 2 is a sectional view taken along the line 2-O-2 of FIG. 3.
Figure 3:
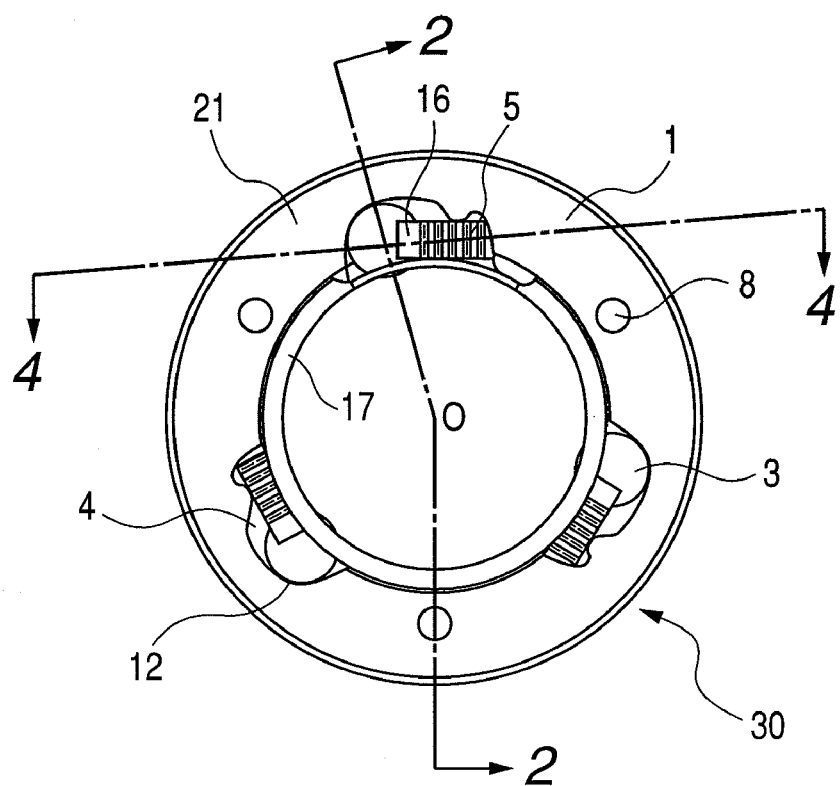
FIG. 3 is a front view looked at from a rear side of FIG. 1.

FIG. 1 is a front view showing a one-way clutch of roller type according to an embodiment of the present invention, looked at from a side where a cover portion is provided, and FIG. 3 is a front view looked at from a rear side of FIG. 1. Further, FIG. 2 is a sectional view taken along the line 2-O-2 of FIG. 3.

FIGS. 1 to 3 show a condition that rollers are engaged by cam surfaces, i.e. a condition that the one-way clutch is engaged under a high load and is locked.

As shown in FIG. 1, a one-way clutch 30 of roller type comprises an annular outer race 1 provided at its inner periphery with a plurality of pockets 4 formed as recesses having cam surfaces 12, an inner race 2 (shown in FIG. 2) spaced inwardly from the outer race 1 in a radial direction and rotatable relative to the outer race and disposed in concentric with the outer race and having an annular outer peripheral track surface 11, rollers 3 disposed in the respective pockets 4 and adapted to transmit torque between the outer peripheral track surface of the inner race 2 and the inner peripheral cam surfaces 12 of the outer race 1, springs 5 disposed in the respective pockets 4 and adapted to bias the rollers 3 toward engagement directions with respect to the cam surfaces 12, and a cage 6 for holding the rollers 3. The cage 6 is not secured to either the outer race 1 or the inner race 2, and, thus, can be rotated relative to the outer race 1 and the inner race 2.

In the illustrated embodiment, there are three pockets 4 provided in the outer race 1, which pockets are disposed equidistantly along a circumferential direction. Further, three bolt holes 8 used for securing the outer race 1 to an input/output member (not shown) and extending through the outer race in an axial direction are also disposed equidistantly along the circumferential direction, and the pockets 4 and the bolt holes 8 are arranged alternately and equidistantly along the circumferential direction. Of course, it should be noted that the number of the pockets 4 can be set to be three to six, for example, in accordance with the magnitude of the torque.

As shown in FIGS. 2 and 3, the cage 6 for holding the rollers 3 comprises a cylindrical portion 10 and an annular flange portion 17 extending radially outwardly from an axial one end of the cylindrical portion 10. Incidentally, in FIG. 3, the flange portion 17 is partially broken so that the pockets 4 can be seen.

Further, the cage 6 has windows 18 the number of which corresponds to the number of rollers 3. The window 18 extends through the cage in the radial direction, but, in the axial direction, both an end of the window near the flange portion 17 and an end 19 remote from the flange portion 17 are closed. In the circumferential direction, a width of the window is smaller than a diameter of the roller. That is to say, the roller 3 is seated in a substantially rectangular window 18 encircled by four sides, thereby preventing the roller 3 from being dislodged in the inner diameter direction and at the same time preventing the rollers 3 from being dislodged in the axial direction. To show a relationship between the window 18 and the roller 3, in FIG. 1, the end 19 of the uppermost window 18 is broken away.

As shown in FIGS. 2 and 3, an axial one end face i.e. axial end face 21 of the outer race 1 is provided with an annular stepped portion 13 with which the flange portion 17 of the cage 6 is engaged. An axial depth of the stepped portion 13 is slightly greater than a thickness of the flange portion 17 so that, when the flange portion 17 is engaged by the stepped portion 13, a clearance is generated between the axial end face 21 of the outer race 1 and the axial end face of the flange portion 17.

Thus, the cage 6 can be rotated relative to the outer race 1 and the cage 6 can be prevented from being dislodged in the axial direction.

As shown in FIG. 1, at the other axial end face i.e. axial end face 22 of the outer race 1, cover portions each adapted to cover at least a part of the corresponding pocket 4 are formed integrally with the outer race 1, and the number of the cover portions corresponds to the number of the pockets 4. Each cover portion 25 is provided at a spring mounting side of the pocket 4 in the circumferential direction.

Figure 4:
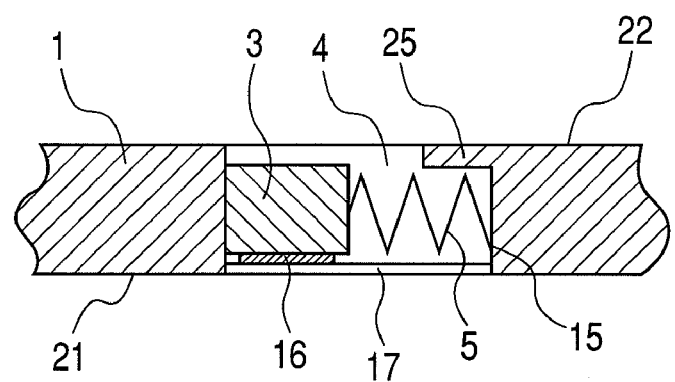
FIG. 4 is an enlarged sectional view of the one-way clutch of roller type according to the embodiment of the present invention, taken along the line 4-4 of FIG. 3.

FIG. 4 is an enlarged sectional view of the one-way clutch of roller type according to the embodiment of the present invention taken along the line B-B of FIG. 3, showing the cover portion 25 in detail.

As shown in FIG. 4, the cover portion 25 is disposed to cover a part of the pocket 4 thereby to cover an end 15 of the spring 4 positioned in the pocket 4 of the outer race 1, thereby preventing the spring 5 from being dislodged toward the axial end face 22 of the outer race 1.

A tab 16 of the spring 5 is pinched between an axial end face of the roller 3 and the flange portion 17 of the cage 6. With this arrangement, the spring 5 can be prevented from being dislodged toward the axial end face 21 of the outer race 1.

In the illustrated embodiment, while an example that the spring 5 is constituted by an accordion spring was explained, the other type of springs such as a coil spring can be used.

The cover portion 25 is provided on the axial end face 22 opposite to the axial end face 21 of the outer race on which the flange portion 17 of the cage 6 is positioned. The reason is that the spring 5 can be prevented from being dislodged in the axial direction by the tab 16 of the spring 5, the window 18 of the cage 6 into which the roller 3 is seated, the flange portion 17 and the cover portion 25.

The cover portion 25 is formed by milling and the like. The cover portion 25 can be formed by cutting the pocket 4 of the outer race 1 by means of the milling operation with leaving a thickness of the cover portion 25 at a position where the cover portion 25 for the pocket 4 is provided.

Further, in the illustrated embodiment, while an example that the cover portion 25 is formed integrally with the outer race 1 was explained, the cover portion may be formed separately from the outer race 1 and then be secured to the outer race 1.

While the present invention has been described with reference to the exemplary embodiment, it is to be understood that the invention is not limited to the disclosed exemplary embodiment. The scope of the following claims is to be accorded the broadest interpretation so as to encompass all such modifications and equivalent structures and functions.

What is claimed is:

1. A one-way clutch comprising:
    an outer race having at least one pocket provided at its inner periphery with a cam surface and having a stepped portion formed on an inner diameter side of an axial one end face of said outer race;
    an inner race spaced apart from said outer race radially inside of said outer race and coaxially arranged for a relative rotational movement;
    a roller disposed in said pocket and adapted to transmit torque between said outer race and said inner race when engaged by said cam surface;
    a cage rotatable relative to said outer race and having a cylindrical portion, a flange portion fitted in said stepped portion and extending outwardly from said cylindrical portion in the outer diameter direction and a window formed in said cylindrical portion and having a circumferential width smaller than a diameter of said roller and adapted to hold said roller; and
    a spring disposed in said pocket and adapted to bias said roller toward an engagement direction with respect to said cam surface;
    wherein a cover portion covering at least a part of said pocket is provided on the other axial end face of said outer race, said cover portion being formed integrally with said outer race and extending along a spring mounting side of said pocket in a circumferential direction of said pocket.

2. A one-way clutch according to claim 1, wherein said cover portion is formed by milling.

3. A one-way clutch according to claim 1, wherein said cover portion extends only part way along said pocket in said circumferential direction of said pocket.

4. A one-way clutch according to claim 1, wherein said cover portion delimits a portion of said pocket having a reduced dimension in an axial direction of said outer race.

5. A one-way clutch according to claim 4, wherein one end portion of the spring is received in said pocket portion of reduced dimension.

6. A one-way clutch according to claim 5, wherein said cover portion extends only part way along said pocket in said circumferential direction of said pocket.

* * * * *